United States Patent [19]

Fraser

[11] 3,844,517

[45] Oct. 29, 1974

[54] SELF LEVELLING STRUCTURE

[76] Inventor: Cyril William Fraser, 23 Victoria Rd., Clifton, Cape Town, Cape Province, South Africa

[22] Filed: Jan. 29, 1973

[21] Appl. No.: 327,635

[30] Foreign Application Priority Data
Feb. 15, 1972 South Africa.................... 72/1005

[52] U.S. Cl. ........................................ 248/188.3
[51] Int. Cl. ............................................ A47b 9/16
[58] Field of Search........... 248/188.1, 188.2, 188.3, 248/188.7, 161, 446, 158, 170, 171, 13, 165, 166, 478; 211/173; 74/533

[56] References Cited
UNITED STATES PATENTS

| 164,315 | 6/1875 | Mandeville | 248/13 |
| 497,042 | 5/1893 | Wood | 248/13 |
| 1,514,811 | 11/1924 | Wittmann | 248/165 X |
| 3,086,407 | 4/1963 | Reece | 74/533 |
| 3,287,991 | 11/1966 | Eckert | 74/533 |
| 3,339,876 | 9/1967 | Kampa | 248/478 |
| 3,384,334 | 5/1968 | Malachowski | 248/478 |

FOREIGN PATENTS OR APPLICATIONS 245,534    1/1926    Great Britain..................... 248/478

Primary Examiner—Roy D. Frazier
Assistant Examiner—Robert W. Gibson, Jr.
Attorney, Agent, or Firm—Karl W. Flocks

[57] ABSTRACT

A self-levelling structure is disclosed which, when placed on an uneven floor, adjusts itself so that the table, stand, support, etc. of which it forms part stands firmly on the floor without wobbling and with the upright thereof exactly vertical or close to vertical. The structure includes two parts which can perform rotary oscillations with respect to one another about the axis of a generally horizontal connecting axle. Locking means, such as teeth, are provided on the parts. These means, when engaged, prevent said rotary oscillations. The parts can tilt away from one another so that the locking means are disengaged. Arms project generally horizontally away from said parts and the upright is secured to one part.

6 Claims, 4 Drawing Figures

PATENTED OCT 29 1974
3,844,517
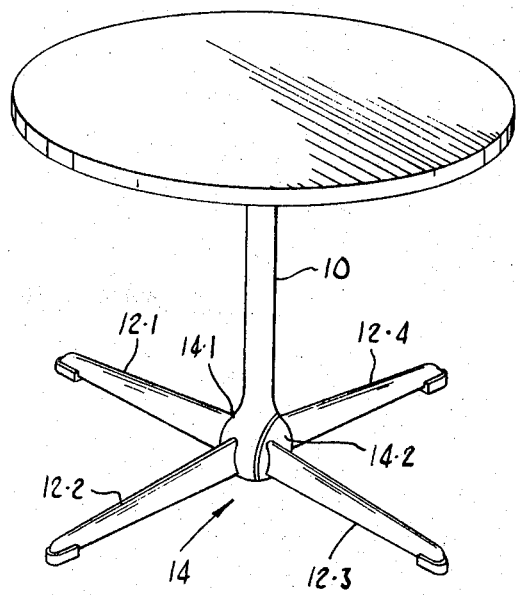
FIG. 1
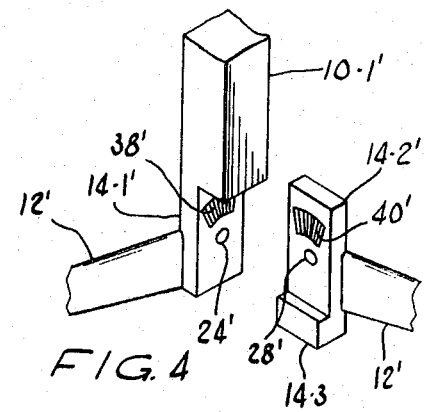
FIG. 4
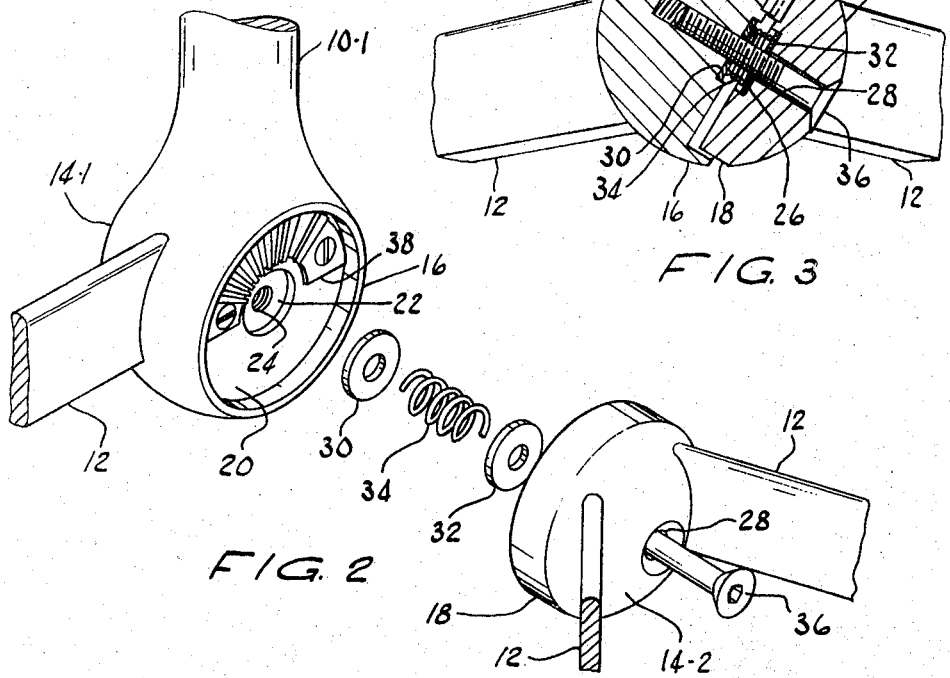
FIG. 3
FIG. 2

3,844,517

SELF LEVELLING STRUCTURE

This invention relates to a self-levelling structure.

According to the present invention there is provided a self-levelling structure which comprises first and second parts connected together for rotary oscillations with respect to one another about a generally horizontal axis, co-operating locking means carried by said parts for preventing oscillation of said parts about said axis, the connection between the parts permitting movement of said parts between a first position in which said locking means are spaced apart and a second position in which said locking means are in engagement, and at least one ground engaging arm projecting from each of said parts in a generally horizontal direction.

The locking means preferably comprises a series of teeth on each part but friction pads or an arrangement including an array of spring loaded pins facing an array of holes can be employed.

Said connection can comprise an axle which extends across a gap between said parts and into bores in said parts, the axle being loose fit with respect to the bore in at least one of said parts. In the preferred constructional form said axle is a screw which passes through an oversized bore in one of the parts and into a tapped bore of the other part. Said one part is thus free to rotate about said screw relatively to the other part.

A spring can be provided for urging said parts to the first position, said spring preferably being a coil spring located between said parts with said screw passing therethrough.

For a better understanding of the invention, and to show how the same may be carried into effect, reference will now be made, by way of example, to the accompanying drawings in which:

FIG. 1 is a pictorial view of a table with a self-levelling structure;

FIG. 2 is an "exploded" view of the self-levelling structure;

FIG. 3 is a view of the assembled self-levelling structure; and

FIG. 4 is a view of the two main components of a further form of structure.

Referring firstly to FIG. 1, the table illustrated has a single central upright 10 with four arms 12.1, 12.2, 12.3 and 12.4 projecting radially from the lower end of the upright, the outer ends of the arms carrying ground-engaging non-slip pads. The self-levelling structure is generally indicated at 14 and is enclosed by a generally spherical, two part housing. The upright 10 and arms 12.1 and 12.2 are integral with the housing part 14.1 and the arms 12.3 and 12.4 are integral with the housing part 14.2.

To faciliate mass production of the self-levelling structure and its application to any table, stand or support, it is preferable for the housing part 14.1 to be integral with a stub upright 10.1 (FIGS. 2 and 3) and with stub-arms 12. Similarly the part 14.2 is integral with two stub arms 12. With this arrangement, any desired type of upright 10 and any desired type of arm 12.1 to 12.4 can be fitted to the stubs provided.

The part-spherical housing part 14.1 is solid and has a circular projecting rim 16 which serves to receive a similar projecting rim 18 of the part 14.2 (see FIG. 3). The flat surface 20 of the part 14.1 is centrally recessed at 22 and formed with a tapped bore 24. The part 14.2 is similarly recessed at 26 and formed with a smooth bore 28.

A washer 30 fits in the recess 22 and a washer 32 in the recess 26, there being a spring 34 between the washers. A screw 36, which constitutes an axle, is passed through the bore 28, the washers 30 and 32 and the spring 34 and screwed into the tapped bore 24 to hold the parts 14.1 and 14.2 together (see FIG. 3). The part 14.2 is thus freely rotatable about the axis of the screw 36 with respect to the part 14.1. Additionally the bore 28 is oversized with respect to the screw 36 so that the parts 14.1 and 14.2 can tilt with respect to one another as will be described. It is preferable for the screw 36 to be an Allen screw, or some other screw requiring a special key and not a screw driver, to minimise the risk of tampering.

The upper region of the surface 20 has secured thereto by screws a plate 38 of arcuate shape which is formed with radially extending teeth. A similar plate 40 (FIG. 3) is secured to the facing surface of the part 14.2.

When the table illustrated in FIG. 1 is lifted to take the weight off the radial arms 12.1 etc., the spring 34 exerts itself to tilt the part 14.2 and the arms attached thereto downwardly about an axis transverse to the longitudinal axis of the screw 38. Should the spring fail then gravitational forces are generally sufficient to cause such tilting. The toothed plate 40 thus moves away from the toothed plate 38 and the teeth which were previously in mesh disengage.

When the table is lowered back to the ground (held by its top or the upright 10 but not by the radial arms) it is the non-slip pads at the outer ends of the arms which first engage the ground. Because the arms 12.3 and 12.4 have tilted downwardly it is usual for the pads at the outer ends of these to engage the ground before the pads on the other arms. Ground unevennesses may result in the pads on the arms 12.3 and 12.4 not engaging the ground together. If the pad on one of the arms 12.3 or 12.4 lands on a high spot so that it engages the ground first, then the part 14.2 rotates about the axis of the screw 36 until the pad on the other one of the arms touches the ground.

Once all four pads are on the ground the weight of the table urges the part 14.1 downwardly so that the parts 14.1 and 14.2 tilt with respect to one another about said transverse axis with the result that the plates 38 and 40 move towards one another. The teeth on the plates 38 and 40 eventually intermesh holding the parts 14.1 and 14.2 in the position to which they have rotated about the axis of the screw 38.

It will be understood that the tilting and rotating movements which take place depend on how uneven the ground is and which pad touches the ground first. The sequence described above is, however, most usual and it is unlikely for tilting to start before all four pads are on the ground for the weight of the table does not usually act downwardly on the self-levelling structure until this occurs.

In a further constructional form, the plates 38 and 40 can respectively be replaced by a series of spring loaded pins and a series of holes for receiving the pins. As the array of pins approaches the array of holes, one of the pins is aligned with a hole and enters it to prevent subsequent relative rotation between the two parts 14.1 and 14.2. All the other pins are pushed back against their spring loading.

The toothed plates 38 and 40 can be replaced by friction pads but such an arrangement is not considered to be as advantageous as the use of toothed plates in view of the possibility that slip may occur under load.

Where the table top is round or square and the upright 10 centrally positioned, the arms 12.1 to 12.4 generally radiate at right angles to one another and are of the same length. This is the arrangement illustrated. If the table top is rectangular or oval and the support centrally positioned, then the arms are all of the same length but the angles are not all 90°. Instead, each pair of arms defines an angle of less than 90° so that, for a given length of arm, the arms extend further from the structure 14 towards the ends of the table than they would with a 90° angle therebetween. Thus stability is improved.

If the upright 10 is offset from the centre of the table towards one end e.g. an elliptical table with the upright near one focus, then the pairs of arms can be of different lengths, two short arms projecting towards the end of the table closest to the support, and two long arms projecting towards the far end of the table. The angles between the arms can be varied to give the most stable support.

By the means described in the two preceding paragraphs different shapes of table top and different locations of the upright 10 with respect to the table top can be accommodated. Similar considerations apply where any off-centre lead is to be supported by the structure described.

The structure illustrated in FIG. 4 is similar to that of FIGS. 1 to 3 except that it has parts 14.1' and 14.2' which are cube-like in form instead of spherical. Toothed plates 38' and 40' are illustrated as are the bores 24' and 28'. The screw 36, washers 30 and 32 and spring 34 of FIGS. 1 to 3 have not been illustrated but an upright 10.1' and two arms 12' are shown.

It will be noted that the lower portion 14.3 of the part 14.2' projects forwardly of the face to which the plate 40' is secured and is, in the assembled condition, beneath the part 14.1'.

I claim:

1. A self-adjusting structure which comprises a first part, a second part, the parts having surfaces which face one another, a load bearing support extending upwardly from said first part, ground engaging arm means extending outwardly from each of said parts, means connecting the two parts so that the second part is able to perform both rotary oscillations and tilting movements with respect to the first part, rotary oscillation of the second part causing said surfaces to move across one another and tilting movement of the second part causing a region of said surface of the second part to move towards or away from a region of the surface of the first part, said second part tilting under gravitational force to separate said regions when not held, by an upward force on the arm means projecting therefrom, in the position in which the regions are in close proximity, and locking means carried by each of said regions of the surfaces for co-operation with the locking means of the other surface to prevent rotation of the second part once the second part has tilted to bring said regions into close proximity with one another, said locking means being spaced and inoperative when the second part has tilted to separate said regions.

2. A structure according to claim 1, in which the locking means comprises a series of teeth on each part.

3. A self adjusting structure according to claim 1, and including spring means for assisting gravitational force in tilting the second part to the position in which said regions are spaced apart.

4. A self-adjusting structure according to claim 1, in which an axle projects from the first part and which the second part has an oversized bore which loosely receives the axle, the second part rotating with respect to the first part about said axle and being free to tilt on said axle about an axis transverse to the axle.

5. A structure according to claim 4 in which said axle is constituted by a screw which passes through an oversized bore in the second part and into a tapped bore of the first part.

6. A structure according to claim 4, and including a coil spring for tilting said second part to the position in which said regions are spaced apart, said spring being located between said parts and said axle passing through the spring.

* * * * *